M. S. SWANSTROM.
SPRING SUPPORT FOR BEDS.
APPLICATION FILED JAN. 6, 1911.
1,005,485.
Patented Oct. 10, 1911.
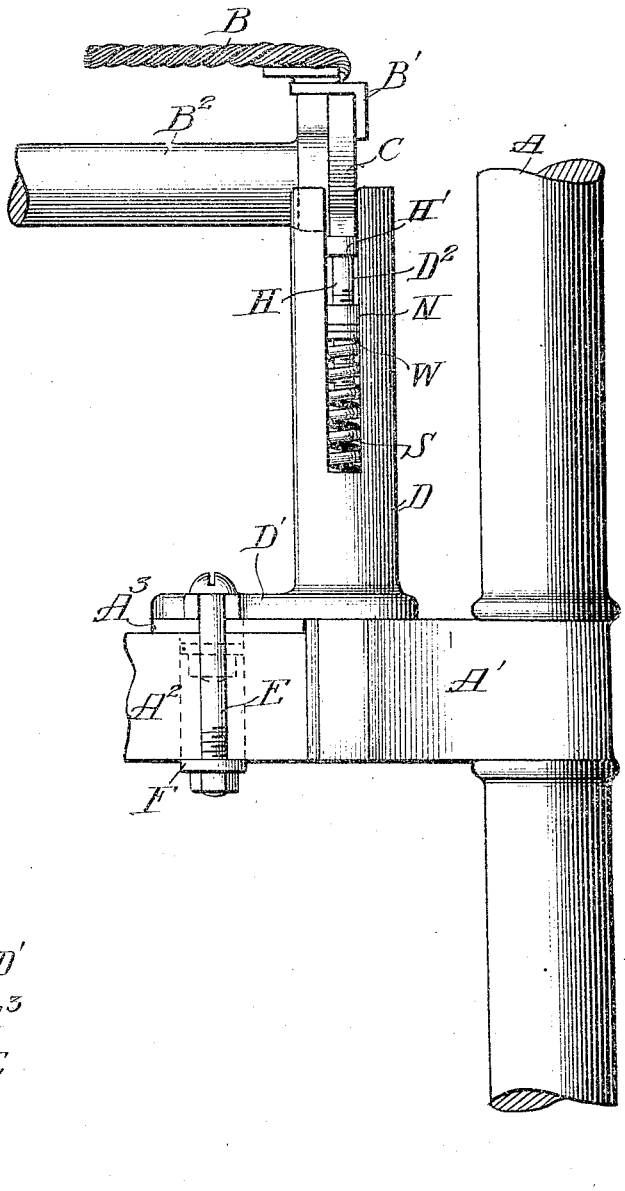
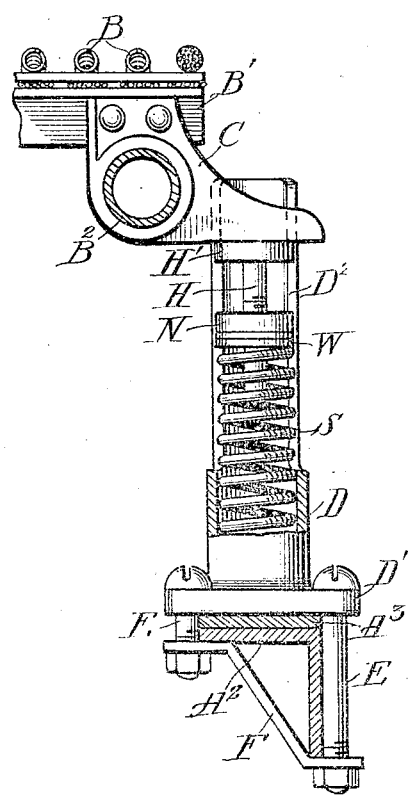
Witnesses
Inventor
Martin S. Swanstrom
By Casper L. Redfield
Atty.

UNITED STATES PATENT OFFICE.

MARTIN S. SWANSTROM, OF CHICAGO, ILLINOIS.

SPRING-SUPPORT FOR BEDS.

1,005,485.  Specification of Letters Patent.  Patented Oct. 10, 1911.

Application filed January 6, 1911. Serial No. 601,154.

*To all whom it may concern:*

Be it known that I, MARTIN S. SWAN-STROM, a citizen of the United States of America, and a resident of Chicago, county of Cook, and State of Illinois, have invented certain new and useful Improvements in Spring-Supports for Beds, of which the following is a specification.

My invention relates to spring supports for beds, couches and the like, and has for its object improvements in such devices.

In the accompanying drawings Figure 1 is a side elevation of my invention applied to a bed; and Fig. 2 is an elevation at right angles to Fig. 1, parts being shown in section.

In the said drawings A, $A^1$ and $A^2$ are parts of an ordinary metallic bed-stead and B, $B^1$ and $B^2$ are parts of an ordinary woven wire spring bed. On the angle iron $B^1$ is secured a bracket C which in ordinary use is intended to rest upon the bracket $A^1$ of the bed. I however, insert a spring support between the bracket $A^1$ and the bracket C, which spring support is made adjustable under each corner of the bed so that the bed itself may be held at a desired position.

Resting partly on the bracket $A^1$ and partly on a filler $A^3$ of some soft material like wood or leather on the side rail $A^2$ is a tubular standard D provided with a flange $D^1$. Both E and clamping plate F serve as a means for securing standard D at a desired position on bracket $A^1$. The upper part of the standard D is slotted as shown at $D^1$ for the admission of a bracket C of the bed. Inside of the tubular standard D is an ordinary helical spring S on the top of which are washers W, and on top of the washers is a nut N screwed upon a bolt H, the head of each one of which serves as a direct support for the bracket C. It will be evident from the construction shown that weight placed upon the bed will cause a compression of the spring S, which spring is in a simple form and of the kind best capable of sustaining compression. It will also be evident that by adjusting the position of the screw N on the bolt H that the tension of the spring S under the bracket C may be varied as desired. In an ordinary bed there are four of these standards D with their associate parts, one being under each corner of the bed. By adjusting the nuts N at the various corners desired tension may be produced upon the different springs or the bed may be brought to either a level or a particular desired incline. Also a certain amount of adjustment may be made by shifting one or more of the washers W from position over a spring at one corner to a spring at another corner. In the case of a bed the greater part of the weight is at one end when it is being used to sleep in, and to accommodate such difference I make it a practice of using springs S of a slightly greater stiffness in two of the standards than in the other two. By this means the bed can be maintained at a particular level both when it is empty and when it is occupied.

The bed-stead and the bed are of the kind commonly used and for the purpose of enabling the support which I have provided, being located at a position which will adapt it to beds having the brackets C at different locations, it will be seen that the bracket is adjustable to various positions on the bed-stead. Thus if the standards be fixed on the bed-stead for one bed and it be desired to substitute therefor another bed having its brackets C somewhat differently located, this different location can be accommodated by shifting the standards D by means of their clamping devices E and F. It will also be observed that the spring S rests loosely inside the standards D and may be easily removed by reaching through the slot $D^1$ and another spring substituted therefor in case the spring becomes weakened through use.

What I claim is:

1. The combination with the projections extending from a bed, of a tubular standard for each projection, into which standard the projection extends, a coil spring within each standard serving as a yielding support for the projection, and means for adjusting the tension of the spring under the projection.

2. The combination with a bed, a bedstead, and projections extending from the bed, of a tubular standard for each projection, said standards being secured to the bedstead and having their upper ends adapted to receive the corresponding projections, and coil springs located within the standards and serving as yielding supports for the projections.

3. The combination with a bed, a bedstead, and projections extending from the bed, of a tubular standard secured to the bedstead beneath each projection, a spring within each standard serving as a yielding support for the corresponding projection, and means for adjusting the tension of each spring under the supported projection.

4. The combination with a bed, a bedstead, and projections extending from the bed, of a standard secured to the bedstead beneath each projection, a spring inclosed by each standard and serving as a yielding support of the corresponding projection, and a screw for adjusting the tension of each spring.

5. The combination with a bed and a bedstead, of a hollow standard secured to the bedstead under each corner of the bed, a helical spring located inside of each standard, and a projection secured at each corner of the bed, said projections being adapted to enter the open upper ends of the standards and to be supported by the springs inclosed therein.

6. The combination with a bed, and a bedstead, of a standard secured to the bedstead under each corner of the bed, and a spring in each standard serving as a support for the corresponding corner of the bed, the springs in two of said standards being slightly stiffer than those in the other two standards for the purpose specified.

7. The combination with a bed, a bedstead, and lateral projections secured to the bed, of a tubular standard secured to the bedstead under each projection and provided with a transverse slot for the reception of the projection, and a helical spring located in each standard and serving as a yielding support of the corresponding projection.

Signed at Chicago, Ill., this 30th day of December 1910.

MARTIN S. SWANSTROM.

Witnesses:
WALTER H. REDFIELD,
C. L. REDFIELD.